US010018731B2

(12) United States Patent
MacLeod

(10) Patent No.: US 10,018,731 B2
(45) Date of Patent: Jul. 10, 2018

(54) PROCESSOR FOR A RADIO RECEIVER

(71) Applicant: QINETIQ LIMITED, Farnborough, Hampshire (GB)

(72) Inventor: Malcolm MacLeod, Malvern (GB)

(73) Assignee: QINETIQ LIMITED, Farnborough (GB)

( * ) Notice: Subject to any disclaimer, the term of this patent is extended or adjusted under 35 U.S.C. 154(b) by 241 days.

(21) Appl. No.: 15/111,042

(22) PCT Filed: Jan. 15, 2015

(86) PCT No.: PCT/EP2015/050678
§ 371 (c)(1),
(2) Date: Jul. 12, 2016

(87) PCT Pub. No.: WO2015/107111
PCT Pub. Date: Jul. 23, 2015

(65) Prior Publication Data
US 2016/0327652 A1  Nov. 10, 2016

(30) Foreign Application Priority Data
Jan. 16, 2014 (GB) .................................. 1400729.8

(51) Int. Cl.
*G01S 19/30* (2010.01)
(52) U.S. Cl.
CPC .................................. *G01S 19/30* (2013.01)
(58) Field of Classification Search
CPC .......... G01S 19/30; G01S 19/29; G01S 19/32; G01S 19/34; G01S 19/24
(Continued)

(56) References Cited

U.S. PATENT DOCUMENTS 5,663,734 A  9/1997 Krasner
5,778,022 A  7/1998 Walley
(Continued)

FOREIGN PATENT DOCUMENTS

EP   1808967 A1   7/2007
GB   2452415 A    3/2009
(Continued)

OTHER PUBLICATIONS

Apr. 15, 2015 International Search Report issued in International Patent Application No. PCT/EP2015/050678.
Apr. 15, 2015 Written Opinion issued in International Patent Application No. PCT/EP2015/050678.
Jun. 20, 2014 Search Report issued in British Patent Application No. 1400729.8.
(Continued)

*Primary Examiner* — Harry K Liu
(74) *Attorney, Agent, or Firm* — Oliff PLC

(57) ABSTRACT

A processor for a radio receiver is adapted to process direct sequence spread spectrum (DS-SS signals), and includes a demodulator, digitizer, correlator, and chip-matched filter (CMF) wherein the digitizer sample rate is selected to take a plurality of samples of each incoming chip at differing points thereon compared to sample points on an adjacent chip and to sample the chip at a non-integer multiple of the chip rate, wherein the CMF is arranged to filter the output of the digitizer. A sample selection unit is arranged to select a single sample from the CMF for input to each tap of the correlator, the selected sample being chosen as that nearest in time to a desired ideal time in relation to a timing reference point on the chip. An improved correlation function results, leading to better tracking performance.

14 Claims, 7 Drawing Sheets

(58) Field of Classification Search
USPC .................................................. 342/357.69
See application file for complete search history.

(56) References Cited

U.S. PATENT DOCUMENTS

| | | | |
|---|---|---|---|
| 6,314,129 B1 | 11/2001 | Sunwoo et al. | |
| 6,452,961 B1* | 9/2002 | Van Wechel | G01S 19/29 375/142 |
| 2001/0053177 A1* | 12/2001 | Papasakellariou | H04B 1/707 375/142 |
| 2007/0008217 A1* | 1/2007 | Yang | G01S 19/24 342/357.68 |
| 2007/0116098 A1* | 5/2007 | Valio | G01S 19/24 375/147 |
| 2008/0260001 A1 | 10/2008 | Betz et al. | |
| 2011/0150046 A1 | 6/2011 | Mo | |
| 2013/0241775 A1 | 9/2013 | Naden et al. | |

FOREIGN PATENT DOCUMENTS

| | | |
|---|---|---|
| WO | 97/40398 A2 | 10/1997 |
| WO | 98/02975 A1 | 1/1998 |
| WO | 02/096054 A1 | 11/2002 |
| WO | 2004/036239 A2 | 4/2004 |
| WO | 2004/036780 A1 | 4/2004 |
| WO | 2010/088597 A1 | 8/2010 |

OTHER PUBLICATIONS

Ward, Phillip W. "A Design Technique to Remove the Correlation Ambiguity in Binary Offset Carrier (BOC) Spread Spectrum Signals". ION, NTM 2004, Jan. 26-28, 2004, San Diego, CA, pp. 886-896.

Paul D Groves; "Principles of GNSS, Inertial, and Multisensor Integrated Navigational Systems;" Artech House; 2013.

* cited by examiner

PROCESSOR FOR A RADIO RECEIVER

This invention relates to methods and systems concerned with the reception of radio signals. More particularly, it relates to methods and systems for the processing of direct sequence spread spectrum signals (DS-SS), such as those commonly employed in Global Navigation Satellite Systems (GNSS).

DS-SS is a modulation scheme used to transmit a digital information signal using a relatively large bandwidth compared to the transmission of the information signal alone. It has benefits including having some resistance to jamming, and allowing sharing of channels among several users, typically with each user transmitting one or more known codes. Typically, for every bit (a bit comprising of ±1 as appropriate) of information to be sent by a user, the bit is multiplied by a code comprising e.g. pseudo random noise, designed to spread the energy across a wider frequency band, and to have good auto-correlation characteristics. The code is known to both the transmitter and the receiver. Demodulation then comprises, at a top level, of determining which code has been sent.

In the simplest case the code comprises a sequence of positive and/or negative pulses, known as chips, and a correlation process in the receiver is used to detect the presence of the code in the received signal. The correlator has knowledge of likely codes to be received, and compares the received chip sequence (following any necessary down-conversion) with its own internal copy of the sequence. This technique is well known, and is described for example in "Principles of GNSS, Inertial, and Multisensor integrated Navigational Systems", Paul Groves, Artech House 2013.

Some systems, such as those generating and receiving the signals used in navigation systems, use relatively long codes, replacing each bit of information to be transmitted with many hundreds of chips. This has benefits including allowing the received signal to be detected despite having a power spectral density orders of magnitude lower than thermal noise, and also generating a temporally very narrow correlation peak, and hence providing more accurate timing (and hence positional) information.

One problem with the use of longer codes however is that additional computational effort is required to implement the system correlation process. For example, in a typical GNSS system, such as the Global Positioning System (GPS), there are several correlators, each having to do many hundreds or thousands of correlations every second. This is exacerbated by the common use of multiple digital samples of each chip increasing the data processing requirements.

A further issue with modern GNSS receivers is the increasing desire amongst the end users for them to function with multiple GNSS systems. The GPS system from the USA is the most common one in use at the moment, but other navigational systems such as the Russian made GLO-NASS system, the Chinese BeiDou system, and the forthcoming European GALILEO system are likely to have an expanded user-base in time, and each of these systems have slightly differing transmission signal formats. Each GNSS system will have its own coding system, and multiple codes that represent the various satellite vehicles (SVs).

Within a receiver for GNSS signals, correlation is used in two different stages of operation. Initially, after starting up (or if the signal is subsequently lost), the receiver must use the correlator to search for the presence of known signals and make an initial estimate of their timing. This is called the Acquisition phase. Which signals are present depends on which satellites are in view, so some known signals may not be present. The timing of those signals which are present is determined from the time of occurrence of the peak in the output of the correlation process. The Acquisition phase is computationally demanding, so the main requirement is to maximise signal detection performance with minimum computational effort.

Once each signal has been acquired, its exact timing must then be continuously estimated as accurately as possible. This is called the Tracking phase. Commonly used methods for doing this require the timing of the correlation to be adjustable so that it "lines up" with the current best estimate of the timing of the received signal.

The design of a GNSS receiver should therefore support the different requirements of Acquisition and Tracking as set out above.

Many digital receiver systems employ matched filters to provide a signal to noise improvement in their received signals. Currently known GNSS receivers do not incorporate matched filters, due to problems with their implementation. This is because a typical receiver would need to implement many such matched filters, due to the many different possible signals that could be received, e.g. to account for different coding schemes and chip rates etc.

In order to explain the currently used methods, consider the common case in which the transmitted chips are rectangular pulses.

Receivers of the type discussed herein all have one or more correlators, whose task it is to compare the incoming signal with a copy of what it is expecting to receive. The correlator then provides an output which is a measure of how similar the input is to a given internal code, as mentioned above.

Consider the task of correlating with a first known sequence (the reference sequence) and assume that this sequence is of duration N chips.

One option would merely be to sample the input signal at the chip rate. At each successive sample time the correlator would then perform correlation of the most recent N samples with the stored reference sequence. Because the transmitted pulses are rectangular in shape, such a method does work to the extent that it produces a correlation peak whether the sample times lie near to the start of each rectangular pulse, near the end of each pulse, or in between. However this simple approach has many well-known disadvantages. First, the process of sampling without first filtering the signal to limit its bandwidth causes the samples to include noise from the entire receiver bandwidth, which makes the output of the correlation noisier, reducing the probability of detecting the signals. Secondly, the very fact that the process is insensitive to the unknown time of sampling within each pulse means that it cannot be used to estimate the time of the occurrence of the pulses in the received signal with the high accuracy required for satellite navigation.

Another approach which could be considered would be to precede the sampling process with a low pass filter. This would reduce the noise level, but the correlation output would then depend on the time within each received chip at which the samples are taken. The timing of the received chips is not known in advance, and even more seriously the timing of received chips from the different satellites is different. This approach is therefore also unuseable.

Increasing the number of samples per chip does provide a means to improve performance, but if the sample rate is chosen to be an integer multiple of the chip rate it still suffers from impairments. If the sampling is not preceded by lowpass filtering, the correlation output is still insensitive to the time of sampling, although over a reduced extent of time uncertainty. Inserting a suitable lowpass filter prior to the sampler reduces this problem. The main remaining disadvantage is that the amount of computation in the correlation process increases in proportion to the sample rate.

A better solution is the basis of the method now commonly used in GNSS receivers. In this approach, the received signal is sampled at a rate equal to K×(M/N) times the chip rate, where N is a large integer and M is another large integer very close in value to N (usually M=N±1). Therefore (M/N) is close to one. K is a small integer. It is easiest to describe the operation of this method if N in the above expression is made the same as the length of the reference sequence, and K=1 and M=N+1 is first considered. In that case, the reference sequence duration of N chips equals N+1 sample times. The interval between successive samples is N/(N+1) chips, so the time of successive samples relative to successive received chips advances by 1/(N+1)th of a chip per chip. Out of the N+1 sample times, one will therefore be very close to the boundary between the end of one chip in the received signal and the start of the next chip. A very small shift in time of the received signal with respect to the samples will therefore result in a change in the correlation output, and as a result this approach provides a nearly smooth variation of correlation output to received signal timing, as desired.

The above method can be used even with K=1, but as explained before the process of sampling without first filtering the signal to limit its bandwidth causes the samples to include noise from the entire receiver bandwidth, which makes the output of the correlation noisier. A commonly used option is to make K greater than one and to precede the sampling by appropriate filtering. However, making K greater than one, which increases the sample rate, again increases the computation load in the correlation.

A further complication in implementing the above method is that the exact alignment of the M samples with the N chips, which is the very quantity which the receiver is required to estimate, affects the correct allocation of the N reference code values to the M correlator coefficient values. Practical solutions require a multiplicity of mapping functions if optimum performance is to be achieved.

If a single receiver is required that can handle all these various formats, then enormous pressure is put upon the receiver's code correlator function. One particular difficulty is that the chip rates of different signals differ, so any single sampling rate will have different relationships to the different chip rates. To use a multiplicity of samplers running at different rates would be very unattractive, because it would result in greater receiver size, weight, cost and power. Therefore the approach described above has to use a further multiplicity of mapping functions to accommodate the different chip rates to the single chosen sampling rate.

It is an object of the present invention to provide an alternative method for processing DS-SS signals.

According to a first aspect of the present invention there is provided a processor system for a radio receiver, the processor system being adapted to process Direct Sequence Spread Spectrum signals, said processor system having a demodulator, the demodulator comprising of a digitiser for digitising a received signal at a predetermined sample rate, said received signal comprising of a sequence of chips arriving at the processor at a known rate; and at least one correlator for correlating the digitised signal with a known signal, the correlator being arranged to have one tap per chip;

the digitiser being arranged to take a plurality of samples of each chip, at differing points thereon as compared to the sample points on an adjacent chip, and to have a sample rate that is not an integer multiple of the chip rate;

characterised in that the processor further incorporates a chip-matched filter (CMF) arranged to filter the output of the digitiser, and a sample selection unit (SSU) arranged to receive outputs from the CMF and to select, for input to each tap of the correlator, the CMF output nearest in time to a desired ideal time in relation to a timing reference point on the chip.

The processor, demodulator and digitiser may advantageously be formed as a single component, or may comprise of two or more components.

Preferably the digitiser is arranged to take at least 4, 8, 16 or 32 samples per chip. The receiver may, in some embodiments of the invention, provide separate in-phase (I) and quadrature (Q) channels, as is well known. In that case each channel may have separate digitisers, each arranged to take at least the number of samples mentioned above. Having a greater number of samples per chip increases the choices of which sample is chosen for input to the correlator, and hence reduces the error between the sample time and the desired ideal time.

For the limitations on the sampling of the chips, as discussed above, to be met, means that there will not be, on average, an exact integer number of samples per chip. E.g. some chips will have in general n samples taken, while others will only have (n−1) samples taken. The sampling points on a given chip will therefore be slightly different as compared to those on an adjacent chip.

It is this shifting sampling position on each chip, coupled with filtering the input using a matched filter (or approximation thereto, as explained below), and choosing a single sample for input to the correlator that provides a key benefit of the invention. Without the differing sampling position, in choosing the closest sample to the desired ideal position, the SSU would always choose a sample with a constant positional error. This would lead to a correlation function having a stepped characteristic, which is not ideally suited for tracking a correlation peak. Having a variation in this error from chip to chip effectively rounds off the steps in the correlation function, leading to improved tracking performance.

Also, having a single correlator tap per chip reduces the workload of the correlator, as compared to prior art techniques wherein typically many digital samples of the chip are input to the correlator. This provides benefits in reducing the power supply demands of the correlator.

The "chip matched filter" may be a matched filter, matched to the chip being received. The use of matched filters is commonplace in sophisticated receiver systems, a matched filter being a filter whose impulse response is the time reverse of the known signal. Such a filter is very difficult to implement in analogue technology for typical DS-SS signals. However, the implementation of a Matched Filter for signals of the type considered here can be simplified by taking account of the fact that the wanted signal is a sequence of identical pulses. It can then be shown that a Matched Filter could in theory be implemented by first filtering the received signal using a filter matched to a single pulse and then sampling the output of that filter and correlating it with the known reference sequence, the spacing of samples into the correlator being one per chip. It is not possible to implement such an initial filter exactly (because of the rectangular shape of its required impulse response) but a close approximation can be implemented, this being a chip matched filter. Note that the terms "matched filter" and "chip matched filter" are used synonymously herein.

The chip matched filters may be implemented as digital Finite Impulse Response (FIR) (also known as feedforward) filters. Because the chip shapes generally used in GNSS can be well approximated by waveforms which take only the values +1 or −1, the chip matched filters typically do not require general purpose multiplier circuits, but instead only require circuits which can multiply signal samples by +1 or −1 (the former requiring effectively no operation, and the latter being a simple negation operation). This requires substantially less circuitry than general purpose multiplier circuits. Further savings are possible because of the typically simple shapes of chips. For example, a filter matched to a rectangular chip whose duration is approximately n sample times would at first sight require n additions (to add together the n consecutive samples) and a buffer containing n−1 samples (to hold the necessary historical samples). However a well-known efficient method called the Recursive Rolling Sum algorithm makes it possible to perform the filtering using one subtraction and one addition together with a buffer holding n samples.

The chip matched filter can be arranged to have an impulse response close to that of a Matched Filter for one chip. As explained previously, the combination of a Matched Filter, sampling of its output at one sample per chip, and correlating the result with the known reference sequence can provide almost optimum detection of the wanted signal in noise.

If the sample rate were chosen to be equal or very close to an integer multiple of the chip rate, then the timing of each selected sample relative to the start or end of each chip would be exactly or nearly the same. This would have the consequence, as mentioned previously, of making the correlator output insensitive to time shift over ranges of time shift, giving an undesirable stepped characteristic in the correlator response.

If instead the sample rate is chosen not to be equal or very close to an integer multiple of the chip rate, then the operation of the SSU causes there to be a variation in this sample timing from chip to chip which has the effect of smoothing away the steps in the correlation function, leading to much improved tracking performance.

The determination of whether a choice of sample rate is acceptable requires knowledge of the number of chips, N, in the reference sequence. The determination then proceeds by simulating the signal, the initial sampling process, digital filter and SSU, for a multiplicity of assumed delays of the incoming signal. This produces an estimate of the correlation response as a function of signal delay. If this contains steps beyond some predetermined threshold (for example, wider than 2% of the chip duration) then the sampling frequency is deemed unacceptable. This process is applied to all the chip rates which the receiver is required to handle. Of course, other thresholds may be applicable in various applications, such as 4%, 6% or 10%, and a person of ordinary skill will be able to determine a suitable threshold for their particular purposes.

It will be known by those skilled in the art that the various GNSS systems differ in their transmitted signal characteristics, and that some current GNSS systems do not employ a simple chip as the transmitted spreading symbol (a chip being a simple rectangular pulse multiplied by +/−1 as explained earlier). Instead some use a more complex symbol, chosen to have desired bandwidth spreading characteristics, such as with the Binary Offset Carrier (BOC) modulation scheme. Of course, in this case, the matched filter would be matched to this spreading symbol. However, for the purposes of this application, all such spreading symbols are referred to herein as chips.

A multiplicity of digital chip matched filters may be implemented, all taking the same sampled signal as input, and each matching one of the required signal types (i.e. chip shapes). It is an advantage of the present invention that a single digital chip matched filter can perform the required matched filtering function simultaneously for all the multiplicity of received satellite signals which use that chip shape.

Such a digital matched filter produces outputs at the same rate as the input sampling rate. During the Tracking phase, as explained earlier, the correlators which are used to track each signal each require different timing, matched to the signal. Each correlator is preceded by its own SSU, which is supplied with the desired ideal sample times in relation to a reference point (such as the start or end of each chip) of that signal. Each SSU independently selects the samples produced by the digital matched filter that are nearest to the desired ideal time. It is an advantage of the present invention that the SSU is a simple function to implement, so that the requirement to implement a large number of tracking correlators is satisfied with low computational effort.

Embodiments of the invention have particular advantage when used in the demodulation of BOC modulated signals. BOC modulated signals are known to have a correlation function that has multiple peaks, and therefore has ambiguity problems when attempting to use the correlation function for tracking purposes. Methods exist for overcoming such ambiguities. See for example "A Design Technique to Remove the Correlation Ambiguity in Binary Offset Carrier (BOC) Spread Spectrum Signals", Philip W. Ward, ION, NTM 2004, which uses a relatively complex arrangement to produce a smoother autocorrelation function having smaller ambiguities. This technique is however not compatible with the common practice of using a sampling clock that is not an integer multiple of the chip rate, as is also employed in the present invention.

Advantageously therefore, for the demodulation of BOC modulated signals an embodiment of the invention has a chip matched filter, having an impulse response in the form of a single BOC chip. For a given desired signal (e.g. an "Early" signal), outputs of the CMF are then used to produce a correlation signal as previously described. The result of this is a complex value. A second correlation is then performed having a known delay applied to selection of the desired signal, of a quarter of a chip. This can be done very simply with the presently proposed architecture by merely adding the required delay to the selection of the desired signal. The outputs of these two correlations are then combined to produce a correlation output that is much smoother than produced in the first stage of processing in Ward, and which is significantly less complex than the second, parallel stage of processing in Ward. The combined output provides a discriminator function close to linear, which hence can be used for tracking purposes in traditional manner. In one implementation, the combination process used outputs the modulus of the complex sum of the two correlation outputs, and the delay separation between the Early and Late gates is set to $19/16$ths of the chip duration. This produces a desirably smooth discriminator response curve.

It will be appreciated that demodulation of BOC signals using the above described technique differs from the cited technique of Ward, as the prior art has its input signal multiplied by both a BOC subcarrier and a BOC quadrature subcarrier.

As a person of ordinary skill in the art would appreciate, BOC signals comprise of a sub-carrier signal multiplied by the chip signal. Normally, this sub-carrier signal is assumed to be a square wave. However, when the signal is transmitted, the signal passes through band limiting circuits, such as transmitters and antennas, which have the effect of rounding off the sub-carrier signal. Thus, in practice the signal received at a receiver is never a true square wave signal. One can also envisage future BOC signals where the sub-carrier intentionally differs from being a square wave.

Embodiments of the invention also have utility when processing signals which are similar to the usual BOC signals, but wherein non-square waves, such as sine waves etc. are intentionally used as the sub-carrier. The term "BOC" as used in this application should therefore be taken to include these other sub-carrier waveforms, as well as the usual theoretical square wave sub-carrier.

According to a second aspect of the invention there is provided a method of processing a direct sequence-spread spectrum (DS-SS) signal comprising a sequence of chips received in a receiver, said chips being received at a known rate, the method comprising the steps of:
 a) digitising the signal at a sample rate at least twice the chip rate, wherein the sample rate is a non-integer multiple of the chip rate, such that successive chips are sampled at different points thereon;
 b) filtering the samples with a chip-matched filter (CMF), wherein the chip matched filter is substantially matched to the expected chip shape, the CMF providing an output sample for each input sample;
 c) selecting a single output of the CMF for each chip for input to a correlator;
 d) correlating the inputs provided by selection step c) with a reference signal;
 wherein the single output from the CMF nearest to an ideal desired timing point for each chip is chosen for input to the correlator.

Features in one aspect of the invention may be applied to other aspects of the invention, in any appropriate combination. In particular, method aspects may be applied to apparatus aspects, and vice versa.

The invention will now be described in more detail, by way of example only, with reference to the following Figures.

Figure 5:
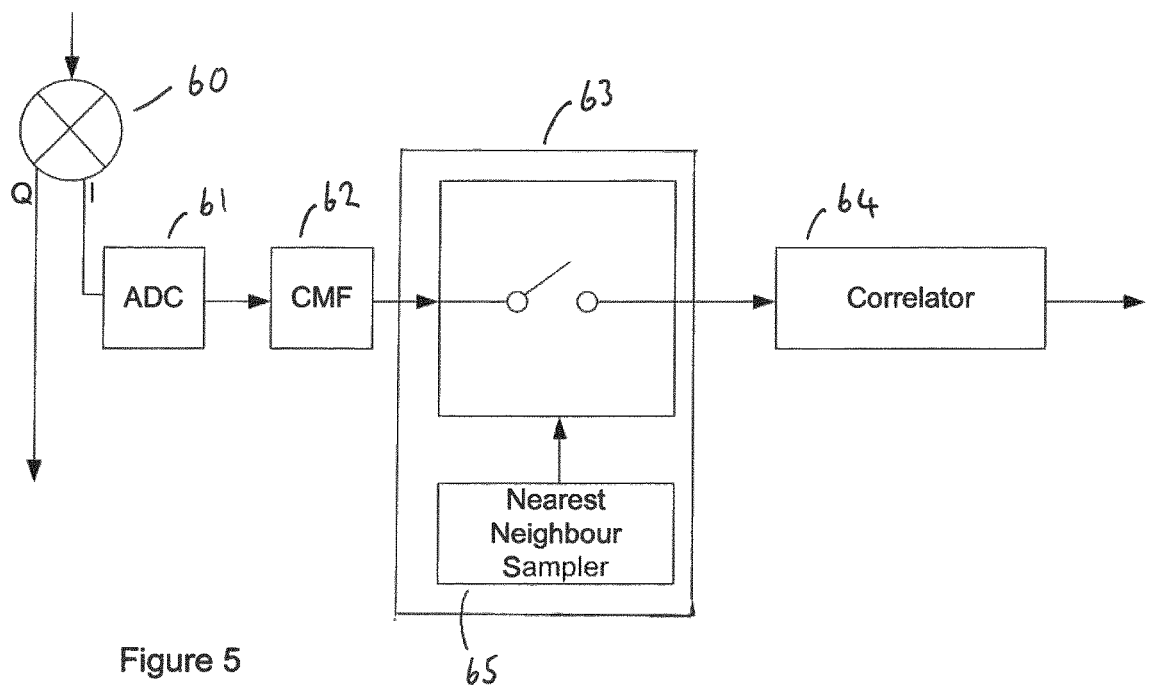
Figure 6:
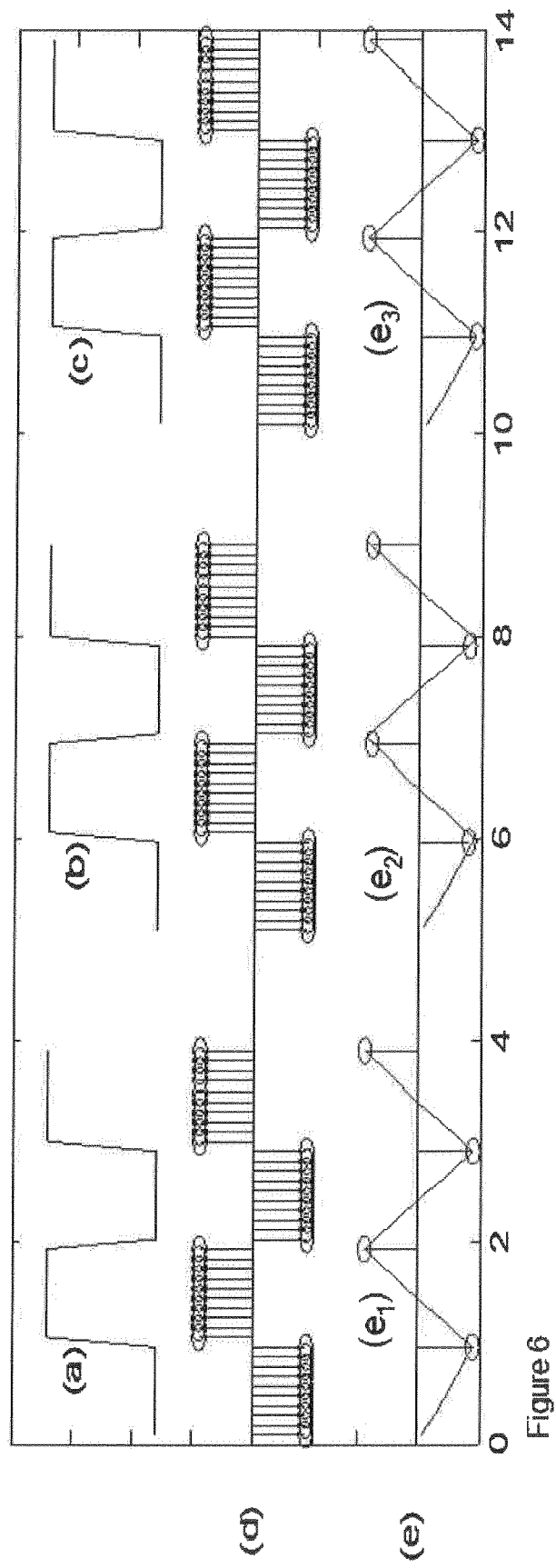

FIG. 5 diagrammatically illustrates a simplified block diagram of an embodiment of the present invention;

FIG. 6 shows waveforms from an embodiment of the present invention, where k(P±1)/P sampling is employed, along with a CMF; and FIG. 7 shows a correlation function and a discriminator function from an embodiment of the invention designed to demodulate BOC signals.

Figure 1:
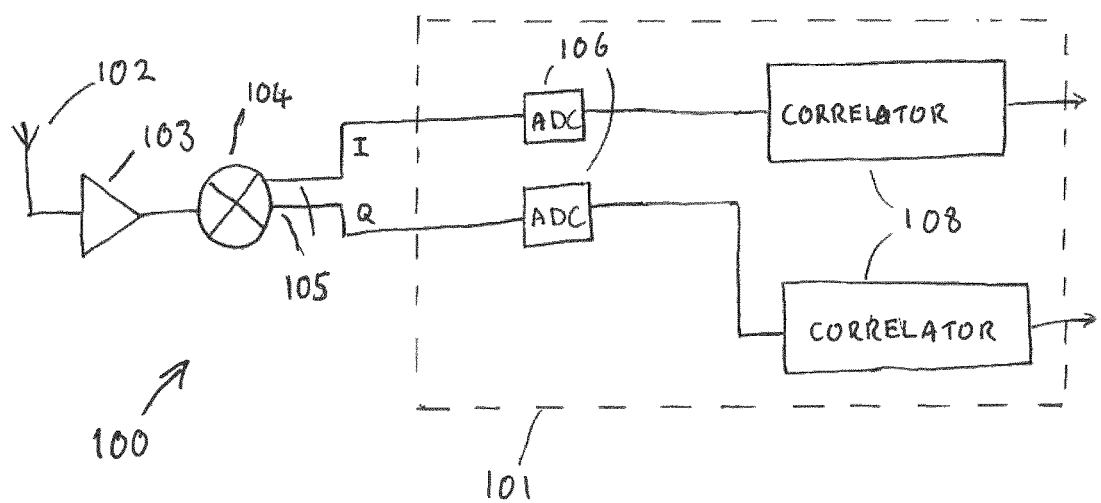
FIG. 1 shows a simplified block diagram of a receiver suitable for implementing embodiments of the present invention.

FIG. 1 shows a simplified block diagram of a radio receiver front-end (100) incorporating a demodulator (101) for DS-SS signals, as may be used in found in prior art GNSS implementations. An antenna (102) is connected to a low noise amplifier (103) and from there to downconverter (104) in conventional fashion, to provide in-phase (I) and quadrature (Q) base band signals at its outputs (105). The I and Q signals are then digitised using the analogue to digital converter (ADC) pair (106) at a rate that will depend upon the particular demodulation architecture used in the system, but is likely to be at least once per chip, and is, in many GNSS receivers, many times more than this.

The digital signals generated by the ADCs (106) are then fed to correlators (108).

Correlator (108) is a conventional correlator of the type commonly employed in DS-SS receivers. The correlator comprises of a set of multipliers and delay elements, and has an input (not shown) which provides a reference signal to be multiplied by the digitised received signal.

The characteristics of the correlator are a key element to the performance of GNSS systems. This is because the correlator output is used not only to detect the presence of a wanted signal, but also to track its time of arrival. Therefore, it is highly desirable that the correlator output has a characteristic that allows such tracking to take place. In GNSS systems the tracking is commonly performed by using multiple correlations, one of which is a "Prompt" correlation in which the timing of the reference signal is adjusted to equal the current estimate of the arrival time of the signal, and others may be an "Early" correlation in which the timing of the reference signal is adjusted to be earlier than the current estimate of the arrival time of the signal and a "Late" correlation in which the timing of the reference signal is adjusted to be later than the current estimate of the arrival time of the signal. Outputs of these correlators may then be processed to provide a loop feedback signal, which adjusts the timing of the taps used to feed the correlators, to give a better estimate of the time of arrival of the input signal, and hence lead to better positional accuracy.

The system of FIG. 1 is not suitable for implementing embodiments of the present invention, but it will be seen from FIG. 5 that embodiments of the invention require relatively minor additions, such adding a CMF function and an SSU function.

Figure 2A:
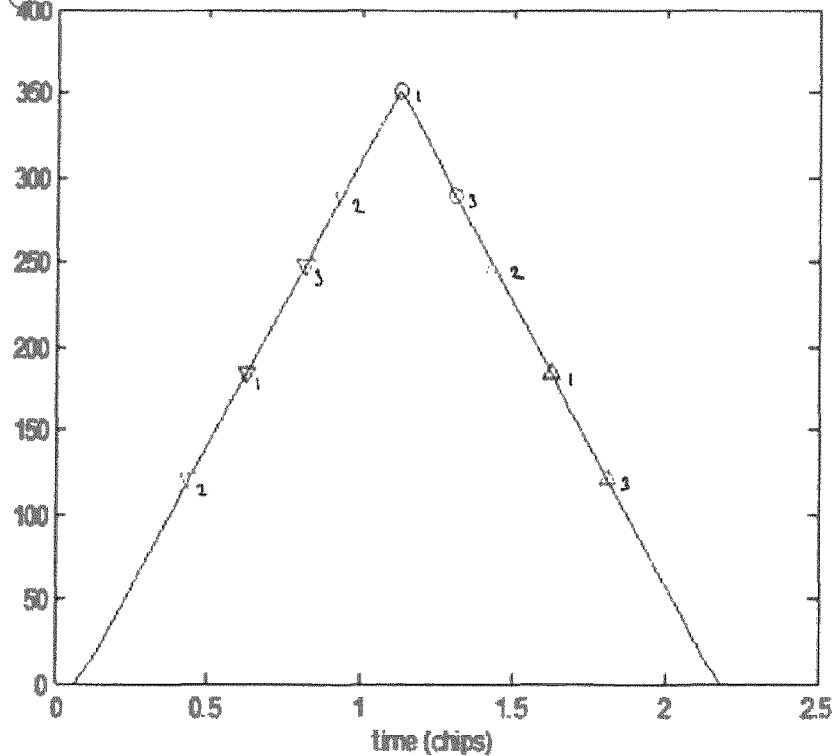
FIG. 2 shows a series of correlations functions from different demodulation architectures.

FIG. 2 shows simulated processed outputs of a correlator providing Early, Prompt and Late outputs. FIG. 2a plots the correlation peak of a correlator output of an idealised analogue system, having square chips, as a function of signal input delay. This has a triangular shape over the particular time span shown. Superimposed on the plot are the outputs from the Early, Prompt, and Late gates. Early is shown as a down-pointing triangle, Prompt a circle and Late an up-pointing triangle, for three cases. The markers suffixed 1 indicate the outputs in the first case, where the receiver's estimate of the peak time is correct. The markers suffixed 2 indicate the outputs if the receiver's estimate of the peak time is early, and the markers suffixed 3 indicate the outputs if the receiver's estimate of the peak time is late.

Figure 2B:
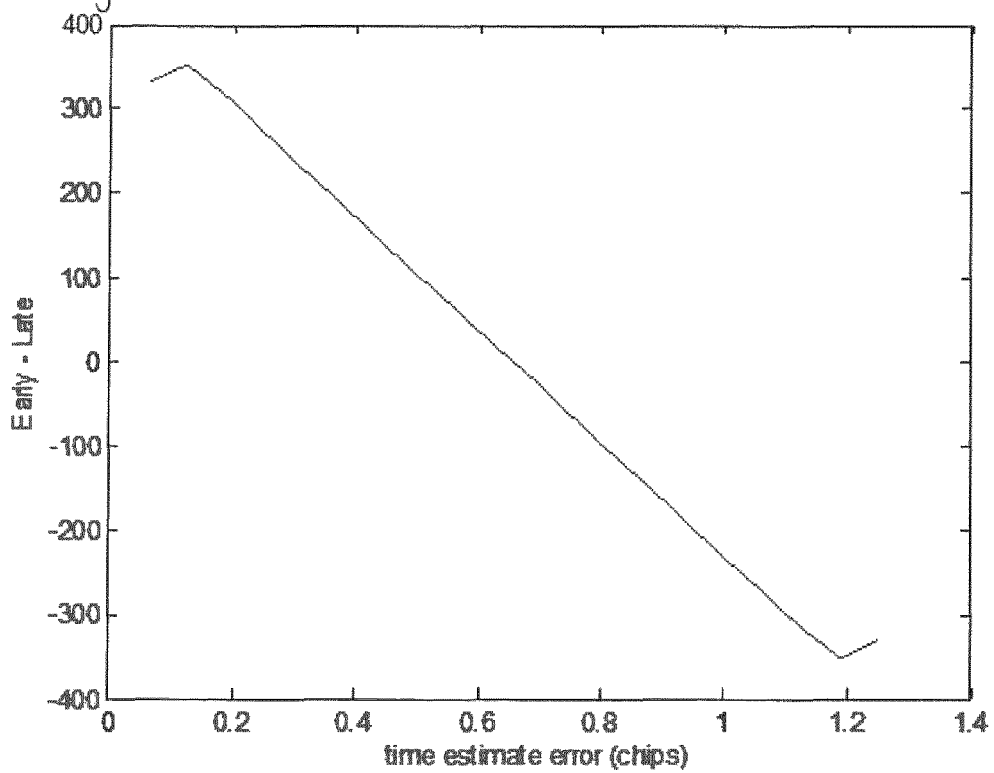

By suitable processing of the Early, Prompt and Late outputs, a "discriminator" function may be produced which, in this ideal case, is a linear monotonic signal across the duration of a single chip. This is shown in FIG. 2b. This is an idealised representation as generated by the equation (Early-Late)/(2×Prompt+Early+Late), where Early is ½ chip in advance of the reference point, Late is ½ chip behind the reference point, and Prompt is at the reference point. The graph is plotted as a function of the time of arrival estimate error, in chips. As is well known, other discriminator functions may be used, such as the equation (Early−Late)/(Early+Late), which is simpler to compute but gives a slightly noisier result.

It is an objective in most GNSS receiver designs to process its input signals to produce a discriminator function that approximates to the basic properties of linearity and monotonicity of the function shown in FIG. 2b, to a sufficient degree for its purposes.

One of the design choices available when designing correlators for DS-SS receivers is the number of taps they have per chip. Correlators used in GNSS devices typically use several taps per chip, and hence each correlation typically correlates several samples of each chip, with many chips being included in each correlation. Thus the work done, and energy consumed, by the correlator is multiplied up by the number of samples per chip.

Figure 3A:
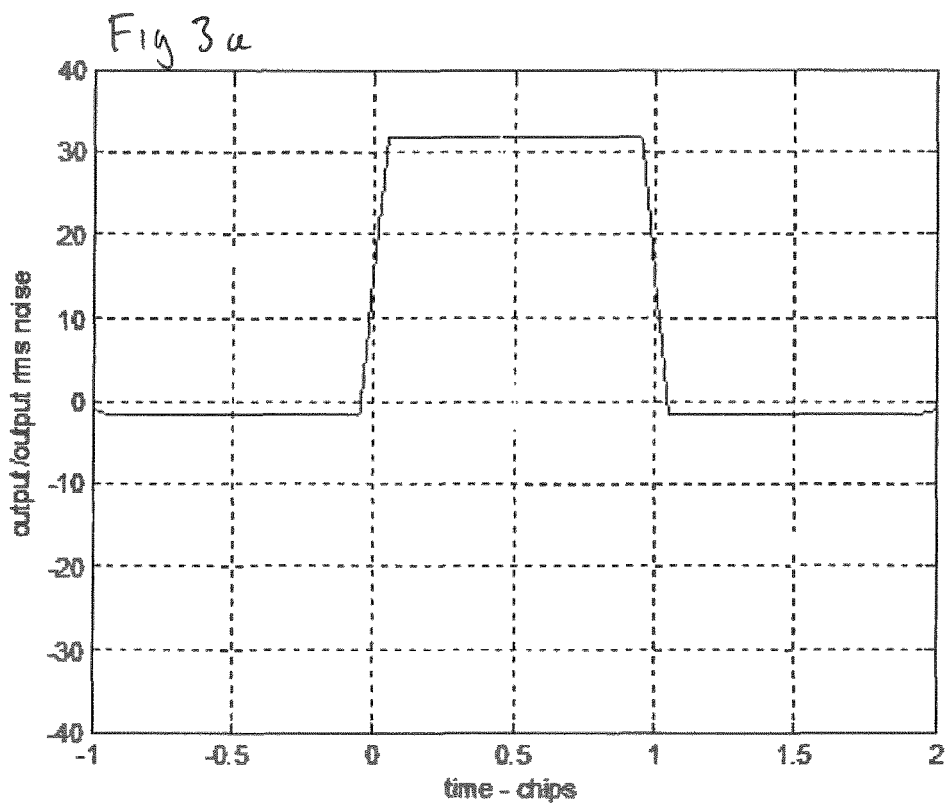
FIG. 3 shows correlation functions in theoretically ideal but non-practical Matched Filter systems to aid understanding of the present invention.
Figure 3B:
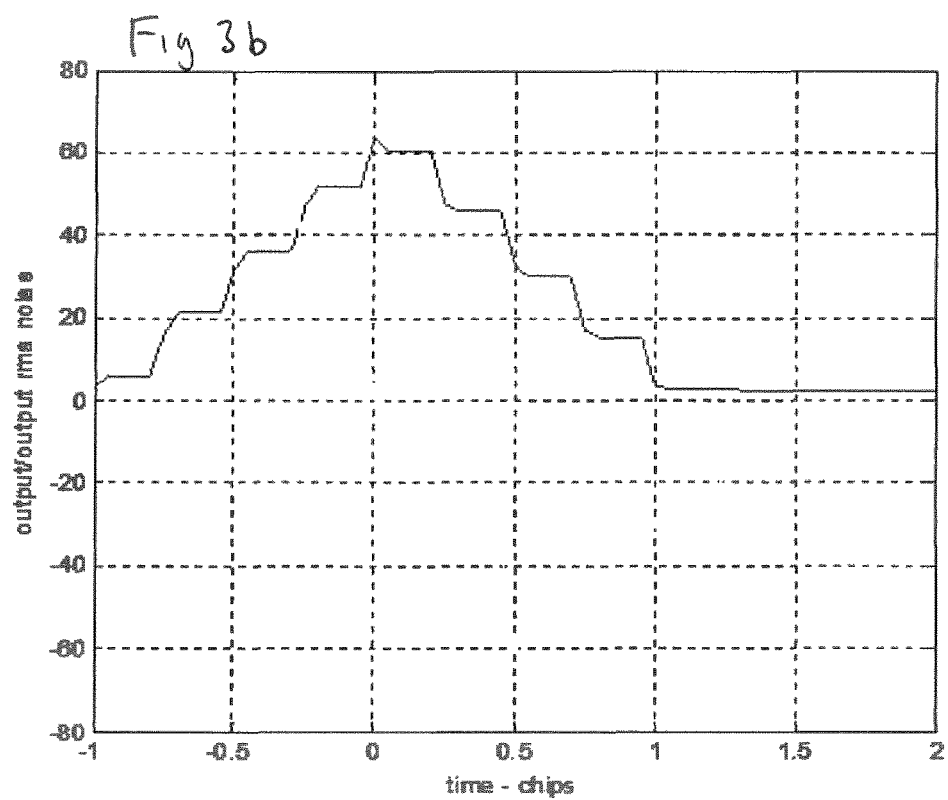

Before this invention, it was understood by those skilled in the art that having a sample rate equal to the chip rate did not provide a practical discriminator function—the function would, with no matched filter being present, resemble a flat topped pulse as shown in FIG. 3a which is unable to provide tracking feedback in a tracking loop. Having a fixed integer multiple of samples per chip improves on this, but results in a discriminator function that is a stepped amplitude pulse, as shown in 3b, with the number of steps equal to the number of samples per pulse (e.g. 4 samples per chip in the case illustrated in FIG. 3b). Again, this is not a useful tracking function for most purposes, unless the number of samples, and correlator taps per chip is sufficiently high, but this also increases the work and power requirements of the correlator.

Prior art GNSS receivers overcome this problem by using regularly spaced sampling having a non-integer average number of samples per chip. Here the sample spacing of correlator taps is chosen to be of the form $k(P\pm1)/P$ times the chip rate, with P a large number—such as the number of chips in the reference function used for correlation. This results in approximately k correlator taps per chip, but the timing of successive correlator taps relative to successive chip boundaries changes progressively.

This produces a greatly improved (nearly ideal) shape for the tracking function characteristic, which approximates to the ideal shown in FIG. 2b in basic form. However, as matched filters are not used, the magnitude of the tracking output function is reduced, leading to poorer performance and increased susceptibility to noise. The factor k (i.e. the approximate number of samples per chip and taps to the correlator) provides an increase to the magnitude of the signal of $\sqrt{k}$, but again with consequential additional processing effort. Existing systems are known to use this technique.

As has been hinted at above, inclusion of a chip matched filter would improve the noise performance of the prior art sampling and correlating arrangements discussed above. However, prior known implementations have issues that render the use of a matched filter problematic, and hence no known receivers implement a matched filter before the correlator.

Firstly, consider the case where the input ADC sample rate is an exact integer multiple of the incoming chip rate. It will be appreciated that the times at which the matched filter may be sampled are the same as the times of input samples. This therefore quantises the correlator delays that may be selected, which also quantises the timing accuracy achievable from the correlator to a degree (with practical sampling intervals) that renders the timing resolution of the correlator not sufficient for most purposes. For example, if the sampling rate is four times the chip rate, the correlation function itself can only be computed at delay values separated from each other by one quarter of a chip. Increasing the sample rate reduces the severity of this problem, but to reduce it to a sufficiently large extent would require a much higher sampling rate than is desirable. Alternatively, to approximate the correlator output at a wanted intermediate delay, the use of interpolating filters could be considered, but that would increase complexity.

As a result, practical receivers for tracking GNSS signals do not use sample rates which are integer multiples of chip rate.

Secondly, consider the case where again there is a CMF used with the prior art sampling methods where the input sample rate is typically $k(P\pm1)/P$ times the chip rate, where P is equal to the number of chips in the reference signal function (typically 1023).

Figure 4:
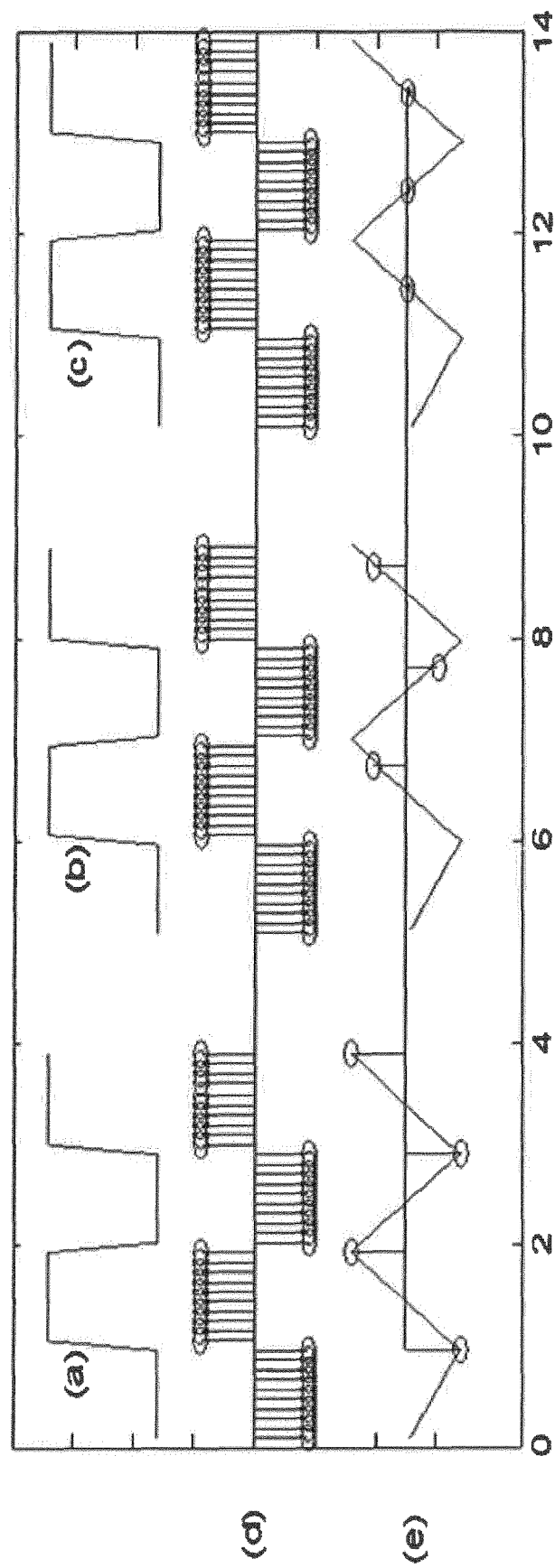
FIG. 4 shows waveforms from a prior art system using k(P±1)/P sampling along with a CMF.

FIG. 4 shows a set of waveforms from a simulation that illustrates the problem with implementing a chip matched filter with the prior art sampling methods described.

With reference to FIG. 4, the top row shows a simulation of four short extracts from a received input signal. In this example the reference sequence for correlation is 1023 chips long, and the input signal is assumed noiseless for clarity of presentation.

The section of input signal (a) is at the start of the 1023-chip reference signal; section (b) is a quarter of the way through it (256 chips) and section (c) is half way through it (512 chips).

The corresponding ADC samples are illustrated in the second row (marked (d)) of FIG. 5; the input sample rate is taken to be 10×1.024 MHz, with a chip rate of 1023/ms in this simulation. Thus the sample rate is 10×1024/1023 times the chip rate. During most chips there are therefore 10 input samples, as can be seen. The chip matched filter would therefore be implemented digitally by summing the preceding 10 samples. The output of the chip matched filter, line (e) would again be approximately sawtooth-shaped (although in fact sampled).

Now consider what happens when we sample the output of the matched filter regularly at every tenth input sample (i.e. at a rate of 1.024 MHz) in accordance with the prior art methods. These samples are illustrated by the stem plot (circles) in row (e).

At the left of row (e) (i.e. the start of the reference sequence) the selected samples are well aligned with the end of each chip time of the input signal, and operation is near-ideal. But in the central section of plot, corresponding to about one quarter of the way through the reference sequence, the time alignment of the samples used (the circles) is about one quarter of a chip before the ideal time. The magnitude of these sampled values is therefore proportionately smaller than ideal, as can be seen, because approximately one quarter of the input samples present in the matched filter at the time the output sample is taken are from the previous chip.

In the right hand section of plot, corresponding to about one half of the way through the reference sequence, the time alignment of the samples used (the circles) is about half a chip before the ideal time. This is the worst possible time to sample the matched filter output because approximately one half of the input samples present in the matched filter at the time the output sample is taken are from the previous chip. In the example illustrated, the previous chip has the opposite polarity to the current chip so the output magnitude is zero.

As the waveform continues to the end of the reference signal the alignment will eventually return to its optimum value once more, but a significant portion of it will have been sampled at times significantly different from the ideal. Performance is therefore significantly poorer than true matched filtering.

The source of the performance loss is that the samples of the CMF output (i.e. the circles in row marked (e) in the plot)

occur (with one exception) when its input is a mixture of the preceding chip and the current chip. Because the rate of samples into the correlator is (P±1)/P times the chip rate, the offset between the actual sample times and the (ideal) chip end times corresponds to every possible multiple of 1/(P±1) chips, each occurring once.

Another way to explain why there is a performance loss is to reiterate that the combination of a chip matched filter followed by a correlator is only theoretically equal to the optimum correlator if the samples are taken from the chip matched filter at a rate of one sample per chip. There is no guarantee of optimality under other circumstances, and as we have shown it is in fact not achieved.

The problems illustrated above are the reason that the CMF has not been used to date in GNSS systems, or any other DS-SS system known to the inventor.

The known prior art systems therefore achieve reasonable performance by using a non-exact number of samples per chip (e.g. k(P±1)P (where P is a large number, and k being an integer typically being between 2 and 8) and correlating the samples with the reference signal function, using a correlator with k taps per chip.

The inventors of the present invention have realised however that the performance can be often improved upon, with generally lower processing requirements, according to embodiments of the invention.

An embodiment of the invention is shown in FIG. 5, and which comprises a receiver having a mixer (60) providing I and Q outputs, each channel of which is digitised by an ADC (61) at a sample rate which is not an integer multiple of the chip rate. Note that only the I-channel processing is shown, as the Q channel processing is functionally identical.

The digital samples from ADC (61) are input to a CMF (62) matched to the form of the chip being received. That is, its impulse response is the same as the time reversal of the expected chip input. There are approximately 10 (or more generally, k) samples per chip at the output of the CMF in this embodiment, equal in number to the samples of the ADC. The (digital) output of the CMF is then fed into a sample selector (63), which is arranged to select, for each chip, the sample that most closely matches the desired ideal sample time, and, during a tracking process, only this selected sample is provided to the correlator (64) for that chip. Thus, the correlator (64) has, when tracking, a single input for each chip, as opposed to many prior art implementations of k inputs per chip.

Note that the sample selector (63) and correlator (64) will be replicated in most embodiments of the invention, to provide e.g. early and late processing as described above, but a single one is shown in FIG. 6 for clarity.

The desired sample times are defined with reference to an internal clock, which is a necessary component of any GNSS receiver. As part of its operation the GNSS receiver eventually calculates the time relationship between that internal clock and the true time of day, as derived from the satellite signals, but it is not necessary to know that relationship to use the internal clock for the purposes described here.

It is simplest to explain the operation of sample selection if it is assumed that the sample clock is used as the internal clock; other options could be chosen but result in more complicated computations. For clarity of explanation the term "one tick" of the clock shall be used to refer to the amount by which clock time increases per input sample. In order to perform a correlation with the reference waveform having a desired delay value (measured with reference to the internal clock, and therefore expressed in ticks) the exact times of the signal samples which would match the delayed reference waveform may be calculated (also measured with reference to the internal clock, and expressed in ticks).

The sample selector (63) selects, for each chip, the sample that most closely matches the desired ideal sample time. Where the latter is expressed in clock ticks, this is achieved by rounding each ideal sample time to the nearest integer. Since integer values of clock ticks correspond to input sample times, and therefore also to sample times of the CMF outputs, these rounded times (in ticks) correspond to actual samples out of the CMF, which are the samples selected.

A convenient way in which the above function may be implemented is to use a well-known device known as a Numerically Controlled Oscillator. This contains a register or store which is initially loaded with the desired first sample time and a second register or store which is loaded with the current estimate of the chip duration (1/chip rate) of the signal. Both quantities are expressed in ticks, including a fractional part to ensure that they are expressed with sufficient accuracy. The value out of the first register is rounded, to produce the time (in exact ticks) of the first sample which is required for correlation. When the time of the latest available sample out of the CMF (in ticks) matches that rounded value, the corresponding sample is passed to the correlator. The value in the second register is then added to the value in the first register and the process is repeated. This continues until the defined number of samples (equal in length to the reference code) has been passed into the correlator.

If the correlator is attempting to track, e.g. the "on-time" signal, then the ideal sampling point from the CMF will be at the end of each chip. Thus the nearest neighbour sampler (65) will choose the sample that is closest in time to the supposed edge of the chip, but, because of the rounding process the actual sample selected may occur either before the end or after the end of the supposed edge of the chip. Recall from above that the embodiment (and indeed all embodiments of the invention) has a non-exact number of samples per chip, and so the temporal spacing between the actual sample instant and the desired ideal sampling instant will be varying from chip to chip.

It will be appreciated that it is trivial to adjust the ideal sampling points, to provide e.g. an Early or a Late gate, and can be done by adding appropriate constant time offsets to the desired sampling times.

FIG. 6 shows a graph that is similar to that of FIG. 4, but instead has a revised waveform (e), as encountered in this embodiment of the invention, and hence shows the benefits provided by this and other embodiments of the invention. Waveforms (a) to (d) are the same as those in FIG. 4, and hence will not be described again in detail.

Waveform (e) of FIG. 6 is a simulated output of a matched filter, broadly similar to waveform (e) of FIG. 4, but instead showing the sample times (i.e. the sample chosen to feed into the correlator for each chip) that are chosen by the SSU in embodiments of the present invention. Here, in this example, the "desired ideal" sampling time is at the end of each chip. The nearest neighbour sampler of FIG. 6 is therefore programmed to select the nearest sample to that ideal point, and hence chooses the sampling points as indicated by circles on waveform (e). At ($e_1$), i.e. at the start of the correlation period, the sample exactly matches the desired point. Due to the non-integer multiple sampling, the sampling interval varies slightly from the ideal, but, as there are a plurality of samples (approx. 10 in this case) out of the CMF per chip, the maximum temporal error between the ideal and the actual sampling point is reduced from half a chip period in prior art systems to half the interval between adjacent samples. Thus at point ($e_2$), which is a quarter of the way through the reference signal, the reduced sample magnitude is apparent, but the error is much reduced compared to that of waveform (e) of FIG. 4 showing a prior art system. At point ($e_3$), which is half way through the reference waveform, the time alignment of the samples used is again close to the ideal.

Thus, embodiments of the invention allow the matched filter output to be sampled at sample times close to the ideal sample times, so providing a greater signal amplitude for the correlator, and thus making the correlator output larger relative to its noise output thereby improving system performance.

Note that during acquisition of the navigation signal (as opposed to tracking of it), it is necessary to search for the signal and during this phase the correlation must be performed repeatedly. There is a performance loss if the actual time of the received signal lies between the times selected for successive actual correlations. This loss is worst if the actual time of the received signal is approximately half way between the times selected for successive actual correlations. The resulting time error results in a smaller signal output from the correlator, and therefore a reduced probability of detection of the signal. If the successive times of correlations are separated by one chip the loss is significant (typically 3-4 dB) so it is normal to make the interval between start times of correlations one half of a chip duration or less.

To achieve the acquisition function efficiently using the present invention, the sample selector (63) is used to select samples out of the CMF which are separated by one half of a chip duration (or if desired, one third or one quarter of a chip duration to further reduce the worst case performance loss). This can be achieved in embodiments of the invention by loading into the second register of the NCO one half (or third or quarter) of the initial estimate of the chip duration of the signal (expressed in ticks). The result is that the sample selector causes a stream of samples to be selected from the CMF which are output at twice (or 3 or 4 times respectively) the estimated chip rate.

These samples are fed into a store (most conveniently a "ring buffer") and as each new sample arrives, the acquisition correlator performs a correlation between the known reference code and samples of stored signal spaced at intervals of one chip. For the case where the samples have been selected to be at twice chip rate, this means the newly arrived sample (let us call this sample 1) together with samples 3, 5, 7, etc. would be used by the correlator. For each newly arrived sample the correlation is performed and its output value is computed.

These successive correlation outputs are then processed in the same way as in prior art GNSS receivers, in order to detect the presence of the signal and provide a first estimate of its time of occurrence.

It will be appreciated that because it is very easy to change the values loaded into the NCO registers of the sample selector (63) it is very easy to change both the timing of the initial sample and the assumed chip duration. In prior art systems using sample rates which are of the form k×(P±1)/P times chip rate, a computation block (sometimes referred to as a "code mapper") is typically required to associate the P values of the reference waveform with the corresponding k×(P±1) signal samples. Furthermore the logic function computed by the code mapper has to be different for different chip rates and different choices of input sample rate.

The present invention is advantageous in that it allows embodiments thereof to support any chip rate and (subject to certain restrictions, which are explained below) a very wide range of sample rates, simply by changing the two values passed to the sample selector NCO. A device implemented using the present invention can therefore easily accommodate sample rates chosen to meet other receiver constraints. This also therefore provides flexibility to handle future signals having different chip rates from current signals.

Analysis has shown that there are certain criteria that embodiments of the present invention should meet to give good performance. These are:

1. The sampling interval $T_S$ should be sufficiently small relative to chip time interval $T_{CHIP}$ to avoid excessive smoothing of the output correlation function. The smoothing occurs because the actual samples selected by the sample selector (63) are at times different from the ideal times, with the time error lying in the range $-0.5\ T_S$ and $+0.5\ T_S$. When a sample is selected at the "wrong" time, its individual contribution to the overall correlation result is equivalent to one from an "ideal" correlation having a delay time slightly different from the desired time. The overall effect of all such errors is similar to smoothing the output curve from the correlator, causing its peak to become more rounded. Since determining the exact time of the peak is the purpose of the receiver, this results in a slight performance loss, so in order to limit that loss the value of $T_S$ should be chosen to be sufficiently small. Note that whether a given degree of smoothing of the output correlation function is excessive will vary according to the application in which it is to be used. Modelling of a proposed system may be used to ascertain the degree of smoothing that is likely to occur.

2. The mean error between the times of the samples selected by the sample selector (63) and the ideal sample times should be sufficiently close to zero—in order to avoid the overall correlator result being biased—and this criterion should be satisfied for any offset of the ideal sample times relative to the start of successive chips. This is best explained by considering a counter-example; namely the case in which the sample rate is an exact multiple of the chip rate. Since in that case the delay times of the available samples relative to the start of each chip are the same relative to each chip start, and since the ideal sampling times also have the equal delays relative to the start of successive chips, each operation of the sample selector (63) selects a sample whose delay relative to the start of the corresponding chip is the same. The error (i.e. difference) between the ideal sample times and the selected sample times is therefore the same for each chip, and may be non-zero. The average value of the error (that is, the bias) may therefore be non-zero. The consequence is that samples used to form the correlation then correspond to a time delay different from the ideal one. This creates the "steppiness" in correlator response described previously, which is an undesirable error. The problem occurs not only for sampling frequencies exactly equal to a multiple of the sample rate but for sampling frequencies sufficiently close to a multiple of the sample rate, as explained in detail below. Again, modelling may be used to analyse a proposed system to see whether it meets requirements.

The above criteria provide a great deal of flexibility of implementation of a GNSS system using the present invention. They make it possible to analyse a candidate GNSS system, having a particular sample frequency, chip rate and correlation length P to check whether it meets a given performance specification. Of course, embodiments of the invention may be made that don't meet the above criteria, but which still have a performance sufficient for a given purpose. They should therefore not be seen as being essential to the invention, but merely as preferable.

The first criterion is easily satisfied if the ratio $f_S/f_{CHIP}$ is greater than about 2. At this value the worst case performance loss is around 1 dB and it is further reduced by increasing the ratio to more than 2. The value 2 is in any case the minimum value used in practical GNSS systems, in order to avoid excessive loss of detection performance during the acquisition stage.

Testing of the second criterion is based on the following analysis. The ideal sample times (in ticks) at the output of the CMF are defined by $$t_0+p\times(f_S/f_{CHIP}), p=0 \ldots P-1$$

where $t_0$ is the time of the first ideal sample (in ticks) $f_S$ is the sample frequency and $f_{CHIP}$ is the chip rate.

The operation of the sample selector (63) selects the samples at times $$\text{round}(t_0+p\times(fs/fchip)), p=0 \ldots P-1.$$

The sampling time errors (in ticks) are therefore $$\varepsilon_p=\text{round}(t_0+p\times(fs/fchip))-(t_0+p\times(fs/fchip)), p=0 \ldots P-1$$

and the "bias" value b is defined as the mean error in sampling time, that is the mean of $\varepsilon_p$.

It can be shown that the worst case bias occurs if the initial ideal sample time is chosen to be exactly half a sample interval before an actual sample time, i.e. $t_0$=<integer>−0.5. (This results in $\varepsilon_0$=−0.5.) Although other choices of initial ideal sample time may also result in the same worst case bias, it is therefore only necessary to test the one case defined in this paragraph.

Exploiting the Fact that $$\text{round}(a)-a=0.5-\text{mod}(a+0.5,1)$$

and hence $$\text{round}(a-0.5)-(a-0.5)=0.5-\text{mod}(a,1),$$

the bias value b (in units of ticks) may therefore be conveniently calculated as follows $$b=0.5-\text{mean}(\text{mod}(p\times(fs/fchip),1), p=0 \ldots P-1).$$

The bias value b should be below a limit which is derived from the required time accuracy of the individual correlation measurements. In a satellite navigation system that is in turn derived from the required positional accuracy of the system and the characteristics of the processing which follows the correlation measurements. Typically that processing has a "smoothing" effect which results in an output error lower than the error from individual correlation measurements.

The bias varies between correlation measurements. The root mean square (rms) value of the bias over a succession of correlation measurements is therefore less than the worst case bias computed using the formula above.

If for example the ultimate positional accuracy of the system requires the individual delay measurements to be made with an accuracy of 1 ns (corresponding to 30 cm of travel of a radio wave), and if the smoothing effect of the processing subsequent to correlation reduces the rms error by a factor of 4, then a worst case bias of 4 ns will comfortably achieve the requirement. To express the bias in units of ticks, the time limit (4 ns) must be multiplied by the sample rate. If for example the sample rate is 20 MHz, the 4 ns limit corresponds to 0.08 ticks (sample intervals).

The procedure for testing whether a proposed sample rate is adequate therefore consists of (i) checking that that $f_S/f_{CHIP}$ is greater than about 2 using the largest value of $f_{CHIP}$ to be handled by the receiver, and (ii) checking that the worst case bias value b, computed as described above, is smaller than the required limit for any values of $f_{CHIP}$ and P that are to be handled by the receiver.

Although the test procedure defined in the preceding paragraph is in principle all that is required, further insight into the application of criteria (1) and (2) is now provided. Let the ratio $f_S/f_{CHIP}$ be expressed as $K+(Q+\delta)/P$, where K and Q are positive integers and $\delta$ lies in the range 0 to 1. P, the length of the reference sequence used in the correlation, is a large integer (many hundreds or thousands in practical applications). Criterion (1) requires that K is at least 2.

It may be shown that if $\delta$ is zero and Q is greater than zero, the bias is very close to zero. This is because the sampling errors are then spread nearly uniformly between −0.5 and +0.5 ticks (that is, input sample intervals). It may also be shown that the worst case bias is greatest when $\delta$ is close to 0.5; its magnitude in ticks is then approximately 0.125/(Q+0.5).

It is not desirable to rely on an exact ratio between $f_S$ and $f_{CHIP}$ because the motion of both the transmitter (a satellite in the case of satellite navigation) and the receiving platform causes changes in the exact value of $f_{CHIP}$. Therefore under most circumstances the preferable strategy is to ensure that Q is sufficiently large that the worst case bias is acceptably small, whatever the value of $\delta$. For example, if the limit on worst case bias is 4 ns, the maximum chip rate is 10.23 Mchip/s, and we consider K=2 (making the sampling rate slightly above 20.46 MHz) we first solve the equation $$0.125/(Q+0.5)<\{4 \text{ ns}\times 20.46 \text{ MHz}\approx 0.082\}$$

which is satisfied provided the integer Q is at least 2. Hence any sampling frequency which differs from 2×10.23=20.46 MHz by at least (2/P)×$f_{CHIP}$ produces acceptably small worst case bias. For a typical value of P, such as 1023, the consequence is that any sampling frequency which differs from 20.46 MHz by at least 20 kHz produces acceptably small worst case bias.

The next band of frequencies which must be avoided is around 3×10.23=30.69 MHz. The equation which must now be satisfied is $$0.125/(Q+0.5)<\{4 \text{ ns}\times 30.69 \text{ MHz}\approx 0.143\}$$

which is satisfied provided the integer Q is at least 1. Hence any sampling frequency which differs from 30.69 MHz by at least 10 kHz produces acceptably small worst case bias.

A versatile multi-constellation GNSS receiver might be required to handle GNSS signals which have a number of different chip rates, for example, 0.5115 MHz, 1.023 MHz, 2.046 MHz, 2.5575 MHz, 5.115 MHz and 10.23 MHz. As has been explained, the choice of sample rate must avoid integer multiples of any of those chip rates, or small bands around those integer multiples.

To illustrate the options achievable, the criteria described above have been applied simultaneously to all the chip rates listed above, to compute all the permitted bands of sample rate within the illustrative overall range from 20 MHz to 35 MHz. It was found that 98.5% of that sample frequency range is permissible, according to the criteria. All integer multiples of 1 MHz or 1.024 MHz are permitted. Only 15 out of 1500 integer multiples of 10 kHz are not permitted.

It can therefore be seen that very wide ranges of sample rate are supported by the method of this invention.

Simulated embodiments of the invention have worked well. The exact form of the output of the correlator in the simulator has been investigated in terms of the quantisation effects generated by the ADC sampling process. These effects place a fundamental limit on the precision with which the correlator can be used to estimate signal delay (and hence navigational accuracy).

It has been found that this inherent quantisation limit is almost exactly the same for embodiments explored by simulation as for a prior art code mapper scheme operating under the same conditions in terms of the sample rate, chip rate and reference sequence duration in chips), where both are simulated in a noiseless environment.

As noise is added to the simulations, and the signal to noise ratio (SNR) is reduced to realistic levels, the two schemes remain equivalent provided that the prior art code mapper and its associated correlator process all the input samples. Embodiments of the invention that employ a matched filtering approach always exploit all the input samples. If a code mapper scheme is implemented which processes only a subset of input samples then its SNR gain and hence performance falls. This can be appreciated by noting that processing fewer than all the samples caused noise to be aliased in. In practice, known prior art code mapper schemes always process samples at too low a rate to achieve optimum SNR. In contrast, the matched filtering approach as used in embodiments of the present invention always exploit all of the input samples.

The present invention has been found to be significantly less demanding to implement, in terms of computational load, than a prior art code mapper approach of similar performance.

As stated above, the invention is well suited to the processing of BOC modulated signals. An embodiment of the invention comprises a receiver having a chip matched filter, and a pair of correlators for each of an Early, Prompt, and Late outputs. The CMFs are matched to the particular form of BOC chip being received.

Each correlator has an associated SSU, with all SSUs taking their inputs from the CMF. For a given pair, one of the SSUs is arranged to select an output from the CMF at its desired point (i.e. Early, Prompt or Late), while the other is arranged to select an output a quarter of a chip later. Each SSU feeds its selected sample to its associated correlator. The selection of the output from the CMF is done in similar fashion to that of the embodiments described above, i.e. by selecting the sample nearest in time to the desired time.

The outputs from each pair of correlators are then combined, this combined value representing the output for the Early, Prompt or Late signals as appropriate.

Both the combination process and the delay separation between the Early and Late gates can be adjusted to produce the smoothest discriminator curve. The best choices of both the combination process and the delay separation are found to be dependent upon the ratio between sample rate and chip rate. Simulation can be used to explore the result and choose the most satisfactory combinations.

For a first case in which the chip rate is 1.023 MHz and the sample rate is 30.0 MHz, a preferred combination process outputs the modulus of the complex sum of the two correlation outputs, and the delay separation between the Early and Late gates is set to $^{19}/_{16}$ths of the chip duration. This is found to produce a desirably smooth discriminator response curve.

Figure 7A:
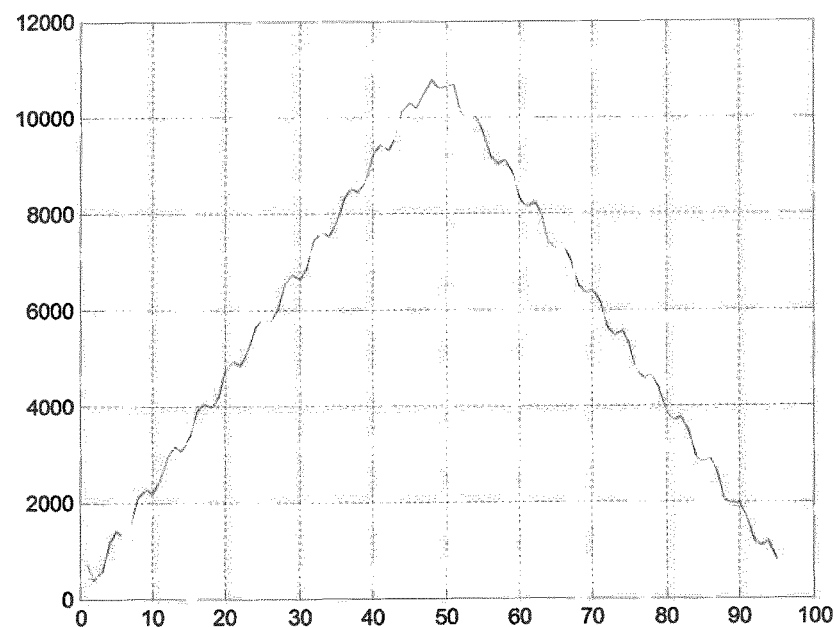
Figure 7B:
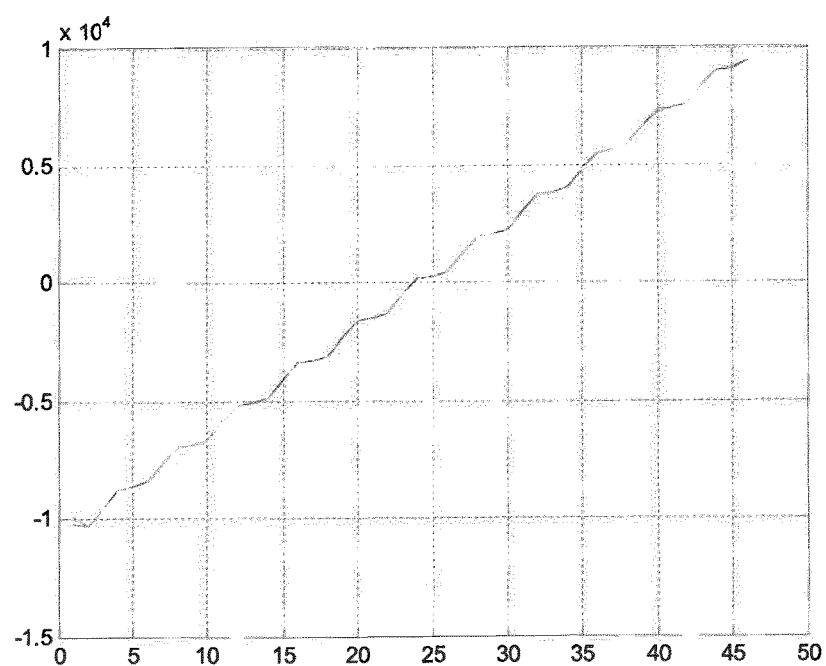

For a second case in which the chip rate is 10.23 MHz and the sample rate is 30.0 MHz, a preferred combination process outputs the square root of the summed moduli of the two correlation outputs, and the delay separation between the Early and Late gates is again set to $^{19}/_{16}$ths of the chip duration. This again produces a desirably smooth discriminator response curve for this case Modelling of this approach has shown that the combined output of a correlator pair has a function as shown in FIG. 7a, the graph showing the combined correlator output magnitude against delay. This has a slightly rippled appearance. However, the more important function is the discriminator function, which is shown in FIG. 7b. This shows (E−L)/(E+L) as a function of delay error. The relatively smooth, linear, and monotonic nature of the function renders it suitable for use in GNSS tracking.

The embodiment described above in relation to the demodulation of BOC signals may be adapted as would be understood by a person of ordinary skill in the art. For example, it may be adapted to have more outputs (e.g. a Very Early, and Very Late), or may have delays different from the ¼ chip delay as used above between the SSUs of each pair. Also, the combining process may be tweaked to provide e.g. a more linear discriminator function. The various changes that may be made may modelled to investigate their effects, and to adapt the properties of the discriminator function or correlation function.

Embodiments of the invention may be implemented in, for example, a field programmable gate array (FPGA), an application specific Integrated Circuit (ASIC), or in any other suitable form. The FPGA or ASIC etc. may incorporate analogue to digital sampling circuitry, or may be arranged to receive digital signals from a separate digitising unit. For GNSS applications, the FPGA, ASIC etc. may be further arranged to implement a full tracking algorithm using outputs of the processor, and so provide as its output a navigation signal. Alternatively, the tracking algorithm may be implemented in a separate processor using outputs provided by embodiments of the invention.

The invention has been described with specific reference to GNSS systems. It will be understood that this is not intended to be limiting and the invention may be used more generally in applications that will occur to the skilled person.

The invention claimed is:

1. A processor system for a radio receiver, the processor system being adapted to process Direct Sequence Spread Spectrum (DS-SS) signals, said processor system having a demodulator, the demodulator comprising of a digitiser for digitising a received signal at a predetermined sample rate, said received signal comprising of a sequence of chips arriving at the processor at a known rate; and at least one correlator for correlating the digitised signal with a known signal, the correlator being arranged to have one tap per chip;

the digitiser being arranged to take a plurality of samples of each chip, at differing points thereon as compared to the sample points on an adjacent chip, and to have a sample rate that is not an integer multiple of the chip rate;

wherein the processor further incorporates a chip-matched filter (CMF) arranged to filter the output of the digitiser, and a sample selection unit (SSU) arranged to receive outputs from the CMF and to select, for input to each tap of the correlator, the CMF output nearest in time to a desired ideal time in relation to a timing reference point on the chip.

2. A processor as claimed in claim 1 wherein the chip-matched filter is matched to a predetermined chip waveform expected at the processor.

3. A processor as claimed in claim 1 wherein the average number of samples per chip taken by the digitiser is at least 2.

4. A processor as claimed in claim 3 wherein the average number of samples per chip taken by the digitiser is at least 8.

5. A processor as claimed in claim 1 wherein the timing reference point is taken with reference to an internal clock system.

6. A processor as claimed in claim 1 wherein the processor has a plurality of correlators arranged in pairs, with a first correlator in a given pair being adapted to have a first desired ideal time at a first point with reference to the timing reference point, and the second correlator in the pair adapted to have a second desired ideal time at a second point with reference to the timing reference point.

7. A processor as claimed in claim 6 wherein the temporal separation between the first and second desired ideal times is set at a quarter of a chip duration.

8. A processor as claimed in claim 6 wherein outputs from the first and second correlators are combined into a single output.

9. A processor as claimed in claim 6, wherein the processor is used to process Binary Offset Carrier (BOC) signals.

10. A processor as claimed in claim 1 wherein the processor is used in the processing of signals from a Global Navigation Satellite System (GNSS).

11. A receiver incorporating a processor according to claim 1.

12. A receiver as claimed in claim 11 wherein said receiver has a front end adapted to provide a down-converted signal to the processor.

13. A method of processing a direct sequence-spread spectrum (DS-SS) signal comprising a sequence of chips received in a receiver, said chips being received at a known rate, the method comprising the steps of:
   a) digitising the signal at a sample rate at least twice the chip rate, wherein the sample rate is a non-integer multiple of the chip rate, such that successive chips are sampled at different points thereon;
   b) filtering the samples with a chip-matched filter (CMF), wherein the chip matched filter is substantially matched to the expected chip shape, the CMF providing an output sample for each input sample;
   c) selecting a single output of the CMF for each chip for input to a correlator;
   d) correlating the inputs provided by selection step c) with a reference signal;
   wherein the single output from the CMF nearest to an ideal desired timing point for each chip is chosen for input to the correlator.

14. A method as claimed in claim 13 further comprising the steps of:
   e) for each chip, selecting a second output from the CMF nearest in time to a second desired ideal timing point, and providing the output to a second correlator;
   f) correlating the selected outputs with the reference signal in the correlator;
   g) combining the outputs of the two correlators to produce a single output.

* * * * *